(12) United States Patent
Barsoum et al.

(10) Patent No.: US 6,442,173 B1
(45) Date of Patent: Aug. 27, 2002

(54) TIMING RECOVERY SCHEME FOR A DISCRETE MULTITONE TRANSMISSION SYSTEM

(75) Inventors: Maged F. Barsoum, Sunnyvale; Chien-Meen Hwang; Eugen Gershon, both of San Jose; Fred Berkowitz, Santa Clara; Muoi V. Huynh, San Jose, all of CA (US)

(73) Assignee: Legerity, Austin, TX (US)

( * ) Notice: Subject to any disclaimer, the term of this patent is extended or adjusted under 35 U.S.C. 154(b) by 0 days.

(21) Appl. No.: 09/286,995

(22) Filed: Apr. 7, 1999

(51) Int. Cl.[7] ................................................ H04J 3/24
(52) U.S. Cl. ...................................... 370/445; 370/447
(58) Field of Search ................................ 370/445, 447, 370/448, 324, 341, 210, 499, 495, 446

(56) References Cited

U.S. PATENT DOCUMENTS

| | | | | |
|---|---|---|---|---|
| 5,416,801 A | * | 5/1995 | Chouly et al. | 370/478 |
| 5,561,686 A | * | 10/1996 | Kobayashi et al. | 375/134 |
| 6,075,795 A | * | 6/2000 | Barsoum et al. | 370/445 |
| 6,339,599 B1 | * | 1/2002 | Hwang et al. | 370/445 |

FOREIGN PATENT DOCUMENTS

| | | |
|---|---|---|
| EP | 0667695 A | 8/1995 |
| EP | 0722235 A2 | 7/1996 |
| EP | 0760564 A2 | 3/1997 |
| EP | 0786888 A2 | 7/1997 |
| EP | 0840486 A2 | 5/1998 |
| EP | 0863644 A2 | 9/1998 |

OTHER PUBLICATIONS

"Carrier Sense Multiple Access with Collision Detection (CSMA/CD). Access Method and Physical Layer Specifications. Std. 802.3–1985", ANSI/IEEE, New York, pp. 24–26, Sec. 3.2.1 to Sec. 3.2.5; p. 30, Sec. 4.1.2.1.1; p. 42, Sec. 4.2.5, 1985.

* cited by examiner

Primary Examiner—Salvatore Cangialosi
(74) Attorney, Agent, or Firm—McDermott, Will & Emery (57) ABSTRACT

A random access data network in accord with the invention will utilize discrete multi-tone (DMT) transmission over a link within a home or other premises, such as over existing in-house telephone wiring. Discrete multi-tone communication in a random access implementation raises a number of timing issues. To address these issues, all packet transmissions through the network will begin with one or more cycles of a defined periodic signal, typically a sinusoid at a specified frequency. All timing of decoding of subsequent signals, such as ID signals and DMT symbols, is based on counting signal sampling intervals following the detected timing mark. The preferred embodiment utilizes differential modulation of the tones within the DMT symbol. Each packet may include a reference symbol to enable demodulation of the first DMT data symbol. Also, the preferred embodiment of the DMT symbol includes a prefix code followed by the actual DMT waveform carrying the modulated information. The prefix code corresponds to a fixed number of samples of time-domain data, such as a copy of the last thirty-two samples used to generate the actual DMT waveform.

28 Claims, 3 Drawing Sheets

TIMING RECOVERY SCHEME FOR A DISCRETE MULTITONE TRANSMISSION SYSTEM

FIELD OF THE INVENTION

The present invention relates to timing recovery in a discrete multi-tone (DMT) data communications network, particularly a network for communications between multiple devices coupled to existing wiring, for example twisted pair telephone wiring in the user's residence.

DESCRIPTION OF THE RELATED ART

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Conventional local area network architectures use media access controllers operating according to half-duplex or full-duplex Ethernet (ANSI/IEEE standard 802.3) protocol using a prescribed network medium, such as 10 BASE-T.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to gauge and quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network without incurring costs for substantial new wiring installation. However, any such network must deal with issues relating to the specific nature of in-home telephone wiring, such as topology and noise. Also, operation over such a media may require sharing the media with other services without interference from or interference with the other services.

With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of public network deployment, for providing substantially higher rates of data communication over twisted pair telephone wiring of the public telephone network. XDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line). These DSL technologies overcome many similar problems with telephone line transport, such as noise, topology and interference with or from other services on the line.

Consider ADSL as a representative example. For an ADSL related service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The most common form of the FDM data transport for DSL services utilizes discrete multi-tone (DMT) technology. A DMT signal is basically the sum of N independently QAM modulated signals, each carried over a distinct carrier frequency channel. The frequency separation of each carrier is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform.

The existing DSL systems provide effective high-speed data communications over twisted pair wiring between customer premises and corresponding network-side units, for example located at a central office of the public telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's copper line. There is no way to use the units for multi-point communications. Also, the existing ADSL modems tend to be quite complex, and therefore are too expensive for in-home communications between multiple data devices of one customer.

A need therefore still exists for techniques to adapt DMT type DSL communications for use over existing in-home wiring. The adaptations should enable multi-point communications. Also, many of the problems overcome by complex methodologies in ADSL communications need corresponding simpler, more cost effective solutions for in-home networking.

For example, digital signal sampling and processing to decode DMT data signals requires accurate timing between the transmitter and the receiver. In existing ADSL communications, one of the tone frequency channels is used as a pilot tone channel. DMT demodulation and decoding for all other channels is based on recovery of timing information from the pilot tone. This eliminates transmission of data over the channel dedicated to the pilot tone. Also, coordination of reception of all of the other channels to the timing from the one pilot tone channel is extremely complex. A need therefore exists for a simpler form of timing recovery, particularly one that is readily adaptable to a multi-point network using existing wiring such as twisted pair telephone wiring on a user's premises In a multi-point, random access communication application, the timing problem becomes more acute. Unlike the point-to-point DSL implementations where communications are always on-going and enable virtually continuous synchronization between transmitter and receiver, the random access type devices only send when they have data to send. There is no on-going synchronization. As a result, there is a need to initiate timing during a communication to determine when and where in the received signal the receiver should look to demodulate the various elements of received information.

SUMMARY OF THE INVENTION

The present invention overcomes the noted problems involved in data networking and satisfies the above stated needs by providing an improved timing recovery technique, at the physical layer, for use in a multi-point DMT communication system. Specifically, at the start of a random access data communication, the transmitter sends a timing mark, preferably in the form of a number of cycles of a defined periodic or cyclical signal. Subsequent sampling operations of the DMT receiver, particularly demodulation of DMT symbols, uses sampling periods at predetermined times following the timing mark. For example, in the preferred embodiments, each packet of data begins with a sinusoidal timing mark of a predetermined frequency, before there is ever any transmission of multiplexed tone signals for DMT symbols. The receiver bases all timing, for processing samples of the symbols containing the information for the packet of data, on counting numbers of sampling intervals following the end of the timing mark.

In the preferred embodiment, a transmitter seeking access to the link initially sends a timing mark followed by an identification and control signal, used for collision detection. If there is no collision, the transmission continues with transmission of DMT symbols. All timing of decoding of the signals, such as the ID signals and the subsequent DMT symbols, is based on counting signal sampling intervals following the detected timing mark. The preferred embodiment utilizes differential modulation of the tones within the DMT symbol. Each packet may include a reference symbol to enable demodulation of the first DMT data symbol. Also, the preferred embodiment of the DMT symbol includes a prefix code followed by the actual DMT waveform carrying the modulated information. The prefix code corresponds to a fixed number of samples of time-domain data, such as a copy of the last thirty-two samples used to generate the actual DMT waveform of the particular symbol.

The maximum benefit of this timing recovery scheme is achieved when used with the cyclic prefix code of samples from the end of the DMT waveform and with differential encoding of the data. Timing errors resulting in processing of several samples of the prefix will produce only a phase error in the DMT processing, however, because of the use with differential decoding there will be no errors in the decoded data.

The inventive timing recovery technique is particularly simple. Also, once the time mark is detected, there is no need to change any further timing operations. There is never any need to adjust the sampling clock.

Aspects of the invention relate to methods of transmission and reception as well as DMT transmitters and receivers implementing the concepts of the invention. Another aspect of the invention relates to a carrier signal bearing the timing mark and one or more DMT symbols in a form consistent with the invention.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The present invention relates to use of a timing mark, to control a variety of operations in a packet data network, particularly in such a network utilizing existing on-premises communication links and providing random access to the network. The timing mark precedes each of several different types of communication over the network. For example, the timing precedes communications by a transmitter in an attempt to access the shared use network link. Detection of the timing mark and subsequent signals, in this example, enables detection of available access as opposed to collisions with transmissions from another transmitter on the network. Another example of use of the timing mark relates to transmission of packets of modulated data. Each packet transmission begins with transmission of a timing mark. The receiver detects this mark and times all decoding of the symbols of the packet from the mark detection. To understand the invention, it may be helpful to consider an example of an actual network implementation, with reference to exemplary drawings.

Figure 1:
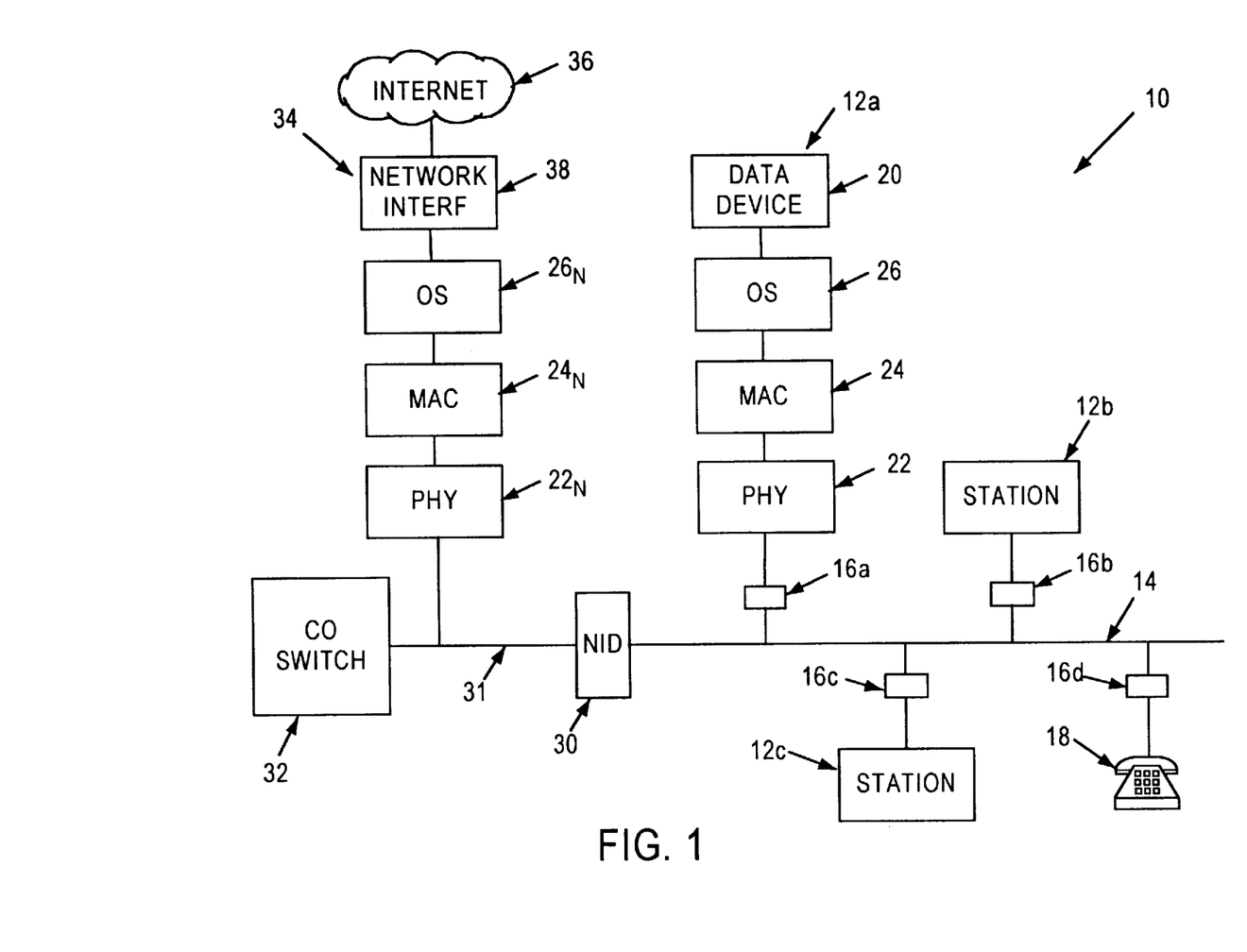
FIG. 1 is a block diagram illustrating a local area network deployed over residential twisted pair wiring.

FIG. 1 is a diagram of a local area network 10 implemented in a home or similar customer premises environment using network link or media 14 according to an embodiment of the invention. The network may use a variety of different physical links for the network media 14, such as coaxial cable, multi-pair cables, power lines, optical fiber or RF wireless communication links. In the preferred embodiment, the media 14 comprises twisted pair telephone wiring, commonly available in the home or office. As shown, the network 10 includes network stations 12a, 12b and 12c that are connected to a telephone line (twisted pair) wiring 14, via RJ-11 phone jacks 16a, 16b and 16c respectively. A telephone 18 connected to the RJ-11 phone jack 16d may continue to make phone calls while one or more of the stations 12 are communicating data.

As illustrated in more detail with respect to exemplary first station 12a in FIG. 1, each home network station 12 comprises a data device 20, for example a personal computer, printer, or intelligent consumer electronics device. Each station 12 also includes a physical layer (PHY) transceiver 22, a media access (MAC) layer 24, and an operating system (OS) layer 26 that performs higher layer functions according to the OSI reference model. In the inventive network, the PHY transceiver utilizes digital signal processing techniques to implement discrete multi-tone (DMT) transport of digital data over the telephone wiring 14.

The stations 12 communicate by transmitting network data modulated into the analog network signals in accord with the invention. In particular, the physical layer transmitter transmits timing signals, modulated control and collision information, and packets comprising discrete multi-tone (DMT) symbols carrying the actual digital communication data. The physical layer receiver receives and processes these signals and demodulates the DMT symbols to recover the data. In accord with the invention, each random access to the media begins with transmission of a timing mark. Packets of data are separated by a gap, so transmission of each packet of data begins with transmission of a timing mark. Signal processing in the receiver is based on recovery of timing from detection of the timing mark.

The network 10 is envisioned as a home network, although it will be apparent that the network may be used in a variety of other customer locations. In many such installations, the network 10 will provide random access to the local area network media 14 for data communications between the stations 12 within the customer premises. For external data communications, one of the data devices 20 may provide an interface to a wide area data network or other data communication facilities. However, it also is within the scope of the invention to utilize the DMT-based data communications to access external data networks.

Normally, the customer premises wiring 14 connects through a network interface device (NID) 30 to a subscriber's telephone line 31. The line 31, in turn connects to a central office (CO) switch 32 of the public switched telephone network. The switch 32 provides normal voice-grade telephone services, for example for communications using the telephone 18.

The preferred implementation of the inventions uses the same 256 tone frequencies as ADSL. Therefore, the line 31 may also transport DMT signals at appropriate frequencies for access to another network. In such an installation, the telephone network operator or another service provider would have a digital terminal unit 34 coupled to the subscriber's telephone line 31. The device 34 provides access to an external wide area data network, for example using ATM or SMDS to gain access to the public packet switched data network commonly referred to as the Internet 36. The digital terminal unit 34 includes a physical layer (PHY) transceiver $22^N$, a media access (MAC) layer $24_N$, and an operating system (OS) layer $26_N$ that perform functions similar to the transceiver 22, the MAC 24 and the OSI 26 in each of the home stations 12. In the terminal 34, however, the data device takes the form of a network interface 38 for providing the appropriate interface to the physical transport media of the higher level data network 36.

The DMT transmitters and receivers in the DMT PHY transceivers 22 may utilize digital signal processors, to generate and/or demodulate complex analog waveforms carrying bits of data modulated onto individual tones within the available bandwidth. For example, the transmitter generates a DMT symbol by generating a predetermined number of samples through a digital to analog converter to produce the analog waveform of the symbol, having the mathematical properties necessary to represent the data carried by the symbol. Similarly, the receiver samples a received waveform and processes the time-domain values of the samples. This processing derives frequency-domain data and then detects the data bits transported on each tone contained within the symbol.

A shared-use link, with random access to the link by the various devices on the link, such as that shown in FIG. 1 presents a number of issues. Resolution of many of these issues requires accurate timing. The invention addresses these issues by transmitting a timing mark at the beginning of each packet transmission and preferably by including a cyclic prefix with each symbol.

Each transmission begins with a timing mark. For example, before sending a first symbol, the transceiver observes the status of the line to determine if the line is free, and if so, a PHY transceiver 22 attempts to seize the line by transmitting a timing mark followed by a modulated identification signal. Any transceiver 22 receiving the signal (including that of the sending station) determines if there has been a collision by recognizing that a signal following the timing mark has been corrupted by collision with a timing signal and/or identification signal from another transmitter.

For each packet of data, the transmitting PHY 22 first sends a reference symbol followed by a number of data symbols. Each symbol appears at a predefined point in the signal following the time mark. The timing marks therefore signify the beginning of new packets. The timing marks also provide timing information necessary for accurate demodulation of the DMT symbols. Each timing mark comprises one or more cycles of a sinusoidal waveform within a predefined frequency band or range. Preferably, the timing mark consists of 1–3 cycles of a specific frequency sinusoid, and the band is narrowly centered about the expected frequency of the sinusoid. Essentially, the band in the preferred embodiment is defined by the tolerances of the components used to generate or detect the timing mark signals.

At the receiving PHY device 24, the receiver circuitry detects the timing mark and bases all subsequent operations on sequential sampling initiated after recovery of the timing mark. Specifically, circuitry in the receiver digitally samples analog signals received over the line at a predetermined rate. From the samples, the receiver first detects a predetermined number of cycles of a frequency appropriate for the timing mark. The mark may represent the beginning of each random access packet data communication. The receiver times each interval by counting a number of the samples, starting from the timing mark. For example, the receiver may initially wait for an interval corresponding to a collision detection interval. After the number of samples for that interval, the receiver captures the samples for a time period corresponding to a first discrete multi-tone symbol to be decoded. The receiver continues to successively count samples to capture and process samples for the next symbol and then subsequent symbols until the processing of the packet is complete. A set of samples are processed to demodulate the bits of data from a particular one of the discrete tone channels represented within each discrete multi-tone symbol.

Consider now a specific example of a waveform including the timing mark, DMT data symbols and certain other information.

Figure 2:
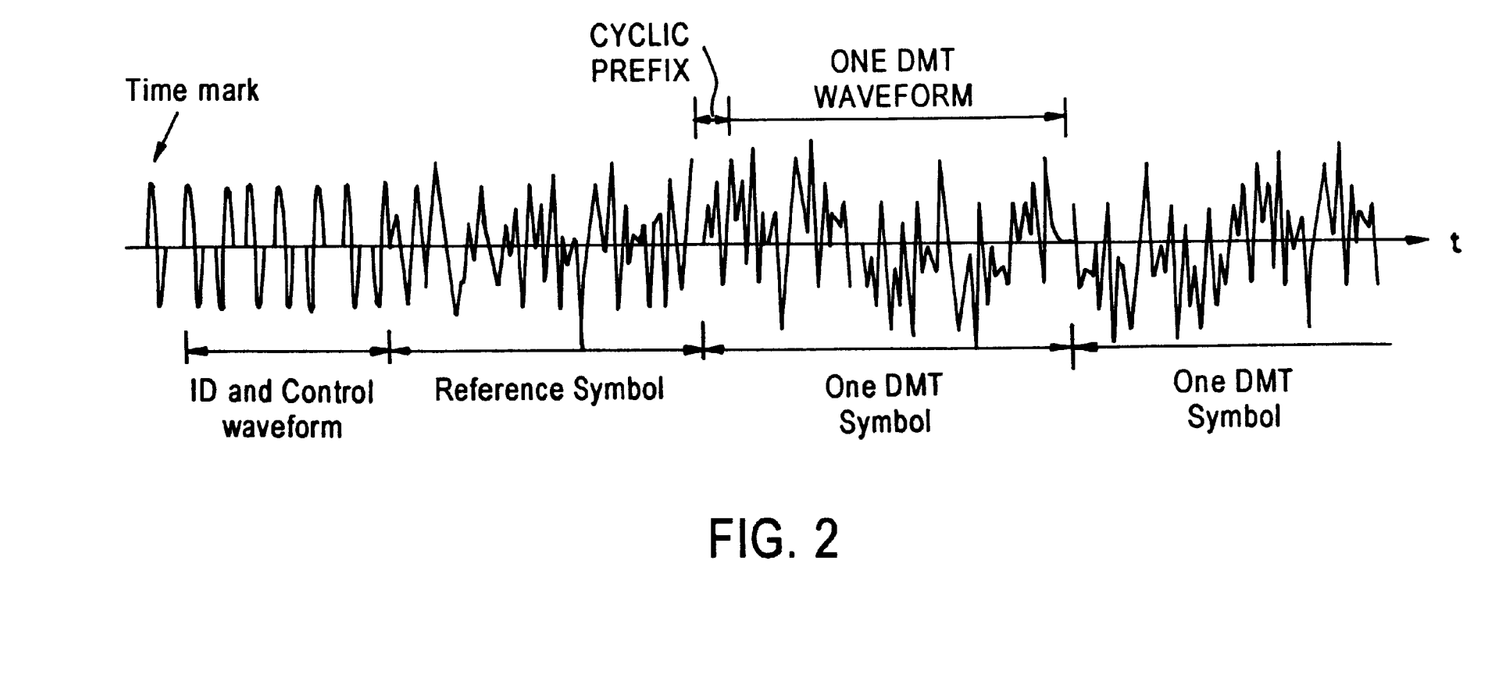
FIG. 2 illustrates an exemplary analog waveform containing DMT symbols, a timing mark and other signals, in accord with the present invention.

FIG. 2 shows an example of a waveform carrying DMT encoded data and the timing mark, in accord with the invention. As shown, the first analog signal contained in the waveform is always a timing mark. Each time mark comprises a number of cycles of the predefined periodic signal, preferably of a sinusoidal waveform. The mark preferably comprises two or three cycles, although for simplicity of illustration, the drawings show only a single cycle.

Every packet transmitted over the line begins with the timing mark. In accord with the invention, the timing mark consists of a predetermined number of cycles (one or more and preferably three cycles) of a sinusoidal waveform. This waveform preferably is not a modulated or mixed signal but rather a pure sinusoid. The timing mark signal preferably has a fixed frequency detectable by the circuitry of a timing mark detector within the receiver. For example, if the DMT communications utilize a 2 Mhz sampling rate for transmission and reception, detection of the cycles of the timing mark may use approximately eight samples per cycle. The preferred sinusoidal timing mark has a frequency in a range around 250 khz. The width of the range around 250 khz would depend on the capacity of the timing mark detector.

As shown in FIG. 2, the transmitter sends certain identification (ID) and/or control information immediately following the timing mark. Following the ID and control information, the analog waveform contains a series of symbols.

A "symbol" is the smallest portion of the information signal, which can be processed as a unit, to decode any data. A DMT symbol, for example, contains within it one component for each active tone channel. The number of bits per symbol corresponds to the number of active tones multiplied by the average number of bits modulated onto each tone. The symbol rate is the number of symbols transmitted per second. The resulting data rate is a function of the symbol rate and the number of bits per symbol.

The preferred embodiment utilizes a symbol-to-symbol differential modulation technique. To facilitate demodulation of the first DMT data symbol, the waveform for each packet will include a reference symbol followed by a series of actual DMT data symbols. The number of symbols in a given packet may vary up to some maximum number.

In accord with an aspect of the invention, each DMT symbol includes the actual analog DMT waveform carrying the data (or reference points) as well as an analog waveform serving as a cyclic prefix. FIG. 2 identifies one such prefix and associated DMT waveform, for this example, those of the first DMT data symbol. The cyclic prefix reduces intersymbol interference (ISI). The cyclic prefix essentially comprises a set number of waveform samples. The preferred methodology utilizes a copy of the last thirty-two samples of the actual DMT waveform as the prefix. The timing for sampling of the DMT symbols for a packet is deliberately designed so that any errors in timing of the sampling in relation to the actual DMT waveform will pick up a small number of samples of the prefix within the same symbol. Because the cyclic prefix is a copy of the last few samples of the DMT waveform, the waveform processing using the few prefix samples results in only a phase variance error. However, because the decoding actually utilizes differential phase demodulation, and the phase variance is constant, this variance will have no impact on the data decoding.

An exemplary implementation utilizes 256 tones as used in ADSL, although in the network 10 all tones are used for each and every transmission (no division into upstream and downstream channels). Most but not all of the tones carry data. This implementation uses a sampling clock of 2 MHz. A DMT waveform developed from 512 samples at that rate is 256 microseconds long. A symbol containing both a DMT waveform and a 32 sample cyclic prefix comprises 544 samples and is 272 microseconds long.

A PHY transceiver 22 attempting to initiate communication over the line 14 sends the ID and control waveform via its transmitter. At the same time the receiver within that transceiver listens to signals on the line, including any signal energy looped back from the associated transmitter. Processing of the signal from the receiver enables the transceiver to determine if there has been a collision. If not, then the transceiver may proceed with sending further signals for the packet(s) of data. A number of different collision detection algorithms may be used. For purposes of this invention, the significant aspect here is that the line seizure and associated collision detection is timed from the cyclical timing mark at the beginning of the transmitted waveform, both in the transmitting station and in all receiving stations.

It should be noted that all PHY transceivers 22 of all stations 12, 34 on the line receive all transmissions relating to data communications made over the line 14, 31. The ID and control waveform is used to physically assert control over the random access media. All receivers demodulate the packet data within the DMT signals. Packet addresses, corresponding to the sending and receiving stations 12 or 34 for a given communication reside within the packet data and preferably are processed by the associated MAC 24.

Figure 3:
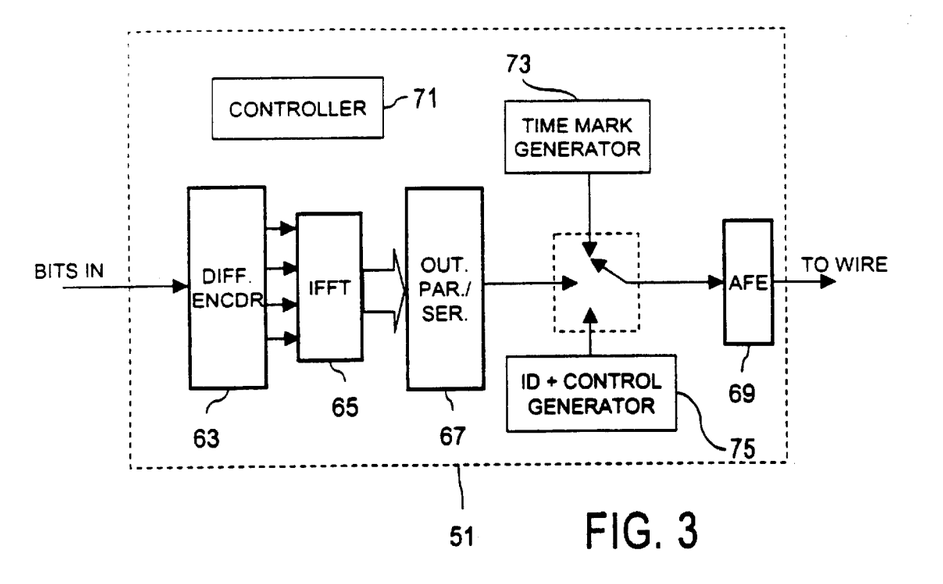
FIG. 3 is a simplified block diagram illustrating the functional or logical elements of a transmitter circuit for implementing timing recovery in a DMT system in accord with the invention.
Figure 4:
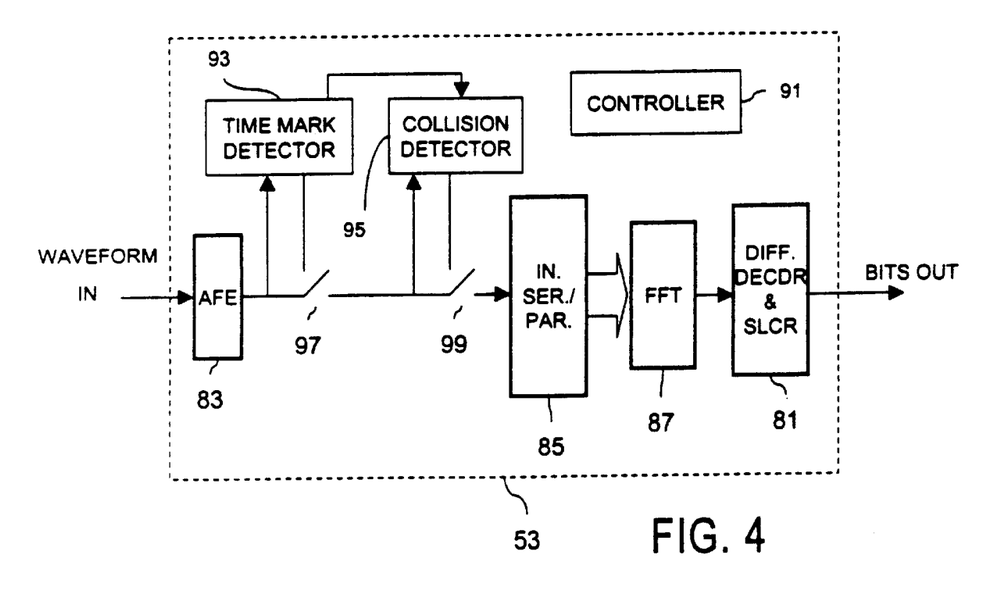
FIG. 4 is a simplified block diagram illustrating the functional or logical elements of a receiver circuit for implementing timing recovery in a DMT system in accord with the invention.

FIG. 3 provides a simplified block diagram of the functional elements of a DMT transmitter, and FIG. 4 provides a simplified block diagram of the functional elements of a DMT receiver for use in the PHY transceivers 22 of the network 10 (FIG. 1).

A transmitter circuit 51 communicates with a receiver circuit 53 over a physical link, in our example the wire 14, 31 (FIG. 1). In the implementation of a DMT PHY transceiver 22, both transmitter circuit 51 and receiver circuit 53 reside on a single printed circuit board. Typically, two DMT transceivers 12 and/or 34 are involved in any communication session across the link 14. For purposes of explanation, FIG. 3 simply shows the transmitter circuit 51 of one transceiver for sending data signals to the receiver elements 53 (FIG. 4) of the second transceiver.

The transmitter 51 receives a digital bit stream from a digital source, for example a host central processing unit (CPU), though the associated MAC 24. The bit stream enters the differential encoder 63 as a serial input. An appropriate number of bits from the serial stream are broken out and assigned to individual bins associated with each available tone frequency. The preferred embodiment uses a form of quadrature phase-shift keying type modulation (QPSK). QPSK modulation typically modulates two bits onto each modulated tone, and as such, there are only four points in the constellation. However, the phase shift modulation may encode more bits onto each component (larger number of points in the constellation). Preferably, the DMT communications utilize a differential modulation technique. For example, if QPSK is used, the transmitter would modulate the tone signal with a difference in phase representing the constellation point (2-bits of information) for that tone in the current symbol. The encoder 63 maps bit sequences of the serial stream to points on the complex plane (i.e., constellation points), in similar fashion to the operating principles of QPSK (quaternary phase shift keying). However, unlike QPSK, the differential encoder 63 encodes the difference between a current constellation point and a reference constellation point.

The difference may be with respect to the constellation point modulated on an adjacent tone (bin-to-bin) or preferably, the difference is with respect to the constellation point carried within the tone channel during the previous symbol (symbol-to-symbol). DMT systems can modulate tones with up to 15 bits of information, using quadrature amplitude modulation (QAM). Those skilled in the art will recognize that the differential modulation may be extended to QAM, to enable transport of higher numbers of bits per tone and per symbol.

In an exemplary embodiment, the differential encoder 63 encodes a bit stream in bit sequences of 2-bits per tone using 256 tone frequencies; as a result, a symbol may represent up to 512 bits, although typically a few tones do not carry data to avoid interference with voice communications over the link. Because the encoding scheme focuses on phase differences, absolute signal values are not needed for correctly detecting and decoding the received symbols. As such, this technique eliminates the need for a frequency domain equalizer (FEQ) to compensate for amplitude and phase distortion caused by the network media 14.

For ease of discussion, the following description assumes differential quadrature phase-shift keying type modulation (DQPSK). Because of the relatively short distances involved in communication over in-home wiring, typically all 256 tones provide adequate transport for the DQPSK modulated signals. However, it is within the scope of the invention to vary the modulation and thus the number of bits modulated onto each tone and/or to vary the number of tones utilized in a particular installation or even during a particular communication session. For example, there may be installations were certain tones are unusable, due to noise or poor line characteristics. In another installation, all tones may be usable, but some can carry differential QAM modulation for various numbers of bits up to 15 bits, but other tones provide only adequate transport for the 2-bit DQPSK. Where the number of tones and/or the modulation and bit rates of the tones may vary from some set standard, the terminals on the line would periodically execute a "training" routine to determine the performance of each tone channel and appropriately set the modulation characteristics for each tone.

Returning to FIG. 3, the output of the differential encoder 63 is a parallel array of "complex numbers" representing phase and amplitude information for each fundamental tone frequency, i.e. expressed in frequency domain values. These complex numbers are input in a parallel manner into an Inverse Fast Fourier Transform (IFFT) logic circuit 65. The IFFT logic 65 converts the complete set of complex numbers from the frequency domain into time-domain samples, which are then supplied to an output parallel-to-serial logic 67.

The analog signal for a DMT symbol comprises a complex waveform. Any waveform can be mathematically expressed as a sum of sinusoidal waveforms of various frequencies, phases and amplitudes. The DMT symbol waveform essentially corresponds to the sum of the tone signals (sinusoids) used for the communication, at their respective frequencies and having at least different phases determined by the data modulated on the respective tones. The tone signals may also vary in amplitude as a function of additional bits of data. The time-domain samples output by the logic 67 represents the waveform as a series of digital samples, in the preferred embodiment 512 samples.

Stated another way, the IFFT logic 65 essentially calculates the sinusoidal waveform for each of the 256 tones, including the phase and/or amplitude associated with the constellation point for each tone frequency. In the example, the DMT waveform should be 256 microseconds long. Assuming a 2 MHz sampling rate, there should be 512 samples to generate an analog waveform of the desired length. The IFFT 65 calculates 512 samples for each of the 256 sinusoidal tone waveforms. For each of the 512 sample intervals, the IFFT 65 adds the calculated samples for the individual sinusoidal tone waveforms to obtain a single sample of the complex DMT waveform. The IFFT logic 65 serially outputs the 512 summation results as the samples for the complete DMT waveform for use in each symbol.

The logic circuit 67 also adds 32 samples for the cyclic prefix code, before the first of the 512 samples corresponding to the actual DMT waveform. In the preferred embodiment, the logic 67 first serially outputs the last 32 samples of the 512 samples corresponding to the actual DMT waveform, for use as the cyclic prefix. The logic 67 then serially outputs the actual 512 samples for the DMT waveform. The output stream from the parallel/serial logic circuit 67 therefore consists of the digital stream for the 544 samples needed for one symbol, whether it is reference information or data. The other analog signals also are represented by appropriate digital samples generated within the transmitter circuit 51.

An analog front end (AFE) 69 processes the serial stream of samples. The AFE circuit 69 performs the digital to analog conversion (DAC) and related filtering and/or other processing of the signal.

As discussed above relative to FIG. 2, the waveform includes a timing mark and an ID and control waveform before the first symbol of each packet. To generate these signals, the transmitter includes a time mark generator 73, a controller 71 and an ID and control signal generator 75. The interconnections of the controller 71 to the other elements of the transmitter 51 are omitted for simplicity of illustration. A clock (not shown) generates a signal defining the sampling clock rate, for example 2 MHz for the transmitter. The sampling clock drives the DAC function of the AFE 69, in the transmitter. The controller 71 counts sampling intervals to control the timing for various operations of the transmitter 51. Logically, the controller 71 controls a timed sample output selection function, represented diagrammatically as a switch, to selectively couple samples from the time mark generator 71, from the ID and control signal generator 75 and from the parallel/serial logic circuit 67 to the AFE 69.

In this manner, samples are added for the additional signals, such as the timing mark and the ID and control waveform. The serial stream of samples for these various signals pass to the AFE 69. The AFE circuit 69 performs the DAC conversion and related analog processing and outputs the resultant analog signal. The analog output signal takes a form similar to the example shown in FIG. 2, for example including one or more symbols containing the differentially encoded tone signals. The AFE 69 sends the analog waveform over the link to the receiver circuitry 53 at one or more of the other transceivers on the network 10.

The time mark generator 73 generates the timing mark by outputting a plurality of pre-stored digital samples corresponding to the sinusoidal waveform of timing mark to the DAC function in the AFE 69, for conversion into an analog signal. Preferably, the time mark generator 73 stores samples for one cycle of this sinusoid, and the time mark generator 73 repeatedly outputs those samples a number of times corresponding to the number of cycles desired for the timing mark. For example, if the timing mark should comprise three cycles of a 250 khz sine wave, the time mark generator 73 would store eight samples corresponding to a cycle of that waveform. The time mark generator 73 would output those samples at the 2 Mhz sampling rate, and the DAC in the AFE 69 would convert the samples to an analog waveform for transmission over the line. This process would repeat for twenty-four sampling periods, until the transmitter sends the analog waveform of the sinusoid three times.

The ID and control waveform generator 75 operates in a manner similar to the time mark generator 73, in that it outputs samples for conversion to the desired waveform. Preferably, the ID and control waveform generator 75 utilizes the same pre-stored samples, but the generator 75 uses those samples as the basis for its modulation. Specifically, the generator 95 multiples each sample as called up from storage with the appropriate level, to modulate the data onto the cycle of the sinusoidal waveform.

The receiver demodulates a DMT symbol essentially by digitally sampling the waveform to obtain real numbers for the time variable signal and processing real numbers to obtain waveform coefficients corresponding to the phase (and possibly amplitude) of the individual tone sinusoids, which would allow the sinusoid to add up to the received symbol waveform. As mentioned previously, the noise within the in-home wiring is quite pronounced. Also, because of the reflections caused by improper terminations, deep nulls are formed at certain frequencies on the home network. As the symbol propagates through the link, the symbol is attenuated when it arrives at the receiver 53. The receiver 53, nonetheless, enables recovery of each transmitted symbol. The receiver 53 receives the analog signal using the AFE circuit 83, which is essentially a mirror image of the AFE 69 in the transmitter 51. The AFE 53 is responsible for filtering the analog waveform and performing a digital to analog conversion ADC to obtain digital time-domain samples of the signal.

For symbol decoding, after processing of the received signal by the AFE 63, the digitized or discrete waveform samples are input to an input serial-to-parallel logic 67 for conversion to a parallel array of waveform samples. A Fast-Fourier-Transform (FFT) processor 87 converts the time domain information of the real numbers into frequency domain information, including frequency, phase and amplitude. The differential decoder and slicer 81 maps the frequency domain information into corresponding bit sequences to recreate the original bit stream. In a DPSK system, the detected phase for each tone channel is compared to the phase for the channel detected during processing of a previous symbol. The decoder 81 essentially maps the differential phase information for each tone is to a constellation and converts the constellation point to its corresponding bits of data. The bits of data derived from all of the channels of one symbol are combined into a serial bit stream and output to the associated MAC 24. The circuits 85, 87 and 81 essentially serve as a DMT demodulator.

The received analog waveform includes a timing mark and possibly an ID and control waveform before the first symbol. To process and detect these signals, the receiver 53 includes a time mark detector 93, a controller 91 and an ID and collision detector 95. The interconnections of the controller 91 to the other elements of the receiver 53 are omitted for simplicity of illustration.

A number of different circuits or software procedures may be used for the time mark detector 93. Preferably, the timing mark detection relies on digital signal processing techniques. Essentially, this detection of the sinusoid involves sampling the analog waveform at the normal sampling rate, and analyzing a number of the samples to detect a condition thereof corresponding to the sinusoidal timing mark, for example to recognize a waveform repeating at or about the expected frequency or periodicity.

In an implementation using the preferred differential modulation, wherein each tone is modulated by the difference from the previous tone in the same channel, the first symbol of the packet is a reference symbol. The reference symbol comprises a cyclic prefix followed by a DMT reference waveform. The reference symbol contains modulated tones for all of the tones in use, for example, for all 256 tones. The modulation could utilize an agreed standard constellation point for each tone, but preferably the data modulated onto each tone within the reference symbol is random in nature. The receiver simply detects the constellation point for each received tone of the reference symbol, and uses that detected point as the reference for demodulation of the corresponding tone in the first data symbol. For the second data symbol, the receiver uses the constellation point found for each tone received during demodulation of the first data symbol as the reference for demodulation of the corresponding tone in the second data symbol, and so on for subsequent symbols within the packet.

A clock (not shown) generates a signal defining the sampling clock rate, for the receiver 53. In our example, the sampling rate is 2 MHz. The receiver clock is independent from the clock of the transmitter sending the signals to the receiver. The sampling clock drives the ADC function of the AFE 81, in the transmitter 51. The controller 71 counts sampling intervals to control the timing for various operations of the receiver 53. Assuming for example that the AFEs 69 and 81 use 2 MHz sampling clock rates. Each sample clock cycle is 0.5 microseconds long. The DMT waveform developed from 512 such samples is 256 microseconds long.

After a silent period when no transmitter has used the line, the time mark detector 93 monitors the samples of the line signal received from the AFE 83. Upon detection of a time mark, the detector 93 closes the first switch 97 to pass subsequent samples. The detector 93 also provides an appropriate timing signal to the collision detector 95. The collision detector 95 analyzes an appropriate number of samples immediately following the timing mark to determine if the transmission is clear or if there has been a collision. In the example illustrated, the ID and control waveform consisted of seven modulated cycles of the basic waveform. The collision detector 95 therefore processes samples for each of seven modulated cycles of waveform, taken from the analog waveform starting after the end of the timing mark. If the collision detector senses no collision (receives a valid ID and control waveform), the detector 95 closes the switch 99 to pass subsequent samples to the serial/parallel logic 85 for processing of the samples for the following symbols.

The controller 91 also times sample processing by the circuits 85 and 87 based on the recovered timing mark. Essentially, from the end of the last cycle of the detected timing mark, the controller 91 begins counting samples. In a data packet as shown in FIG. 2, for example, the controller 91 counts the samples corresponding to the expected length of the ID and control waveform. If no collision is detected, after these samples the controller 91 enables operation of the serial/parallel logic 85 and the FFT 87. The controller 91 counts a set number of samples, e.g. the next 30 samples, for the cyclic prefix and causes the FFT 87 to disregard those samples. The controller then causes the FFT 87 to process the next 512 samples, to decode the DMT reference waveform. It will be noted that if the timing is perfect, this decoding operation will process 2 samples from the prefix. If the control timing is early in relation to the actual DMT waveform, the decoding will actually process a few more samples of the prefix. If timing is slightly late, the decoding may process 2, 1 or none of the samples corresponding to the cyclic prefix. In all of these cases, the DMT decoding process for the first symbol ends at or near the last of the 512 samples of the DMT waveform and does not include any of the prefix of the next symbol. In all of these cases, any processing of samples of the prefix, which match samples at the end of the DMT waveform, introduces only a phase variance.

After counting the samples for the DMT waveform for the first (reference) symbol, the controller 91 counts 32 samples for the prefix of the next symbol of the packet. The controller 91 causes the FFT 87 to disregard those samples and then causes the FFT 87 to process the next 512 samples, to decode the DMT reference waveform. Any timing error induced by the sampling of the first (reference) symbol carries through to the sampling of the second, symbol. However, because of the decoding determines the difference in phase from symbol to symbol, the constant phase variance caused by the sampling has no effect on the demodulation. The controller repeats the process for the prefix and DMT waveform of the next symbol and causes the circuit 81 to output the serial data. Similar counting continues until the end of the last symbol of this packet.

Each packet of data sent or received over the line will begin with a timing mark and will include a number of symbols. Each symbol includes a cyclic prefix followed by a modulated waveform, and the controller 91 identifies the start and end of each prefix in a symbol of a packet by counting sampling clock intervals from the last sample of the detected timing mark for the packet. As a result, the cyclic prefixes separate the individual symbols within a packet. The cyclic prefix comprises a predetermined number of samples of a DMT modulated waveform, for example, the last 32 samples of a previous DMT symbol.

Those skilled in the art will recognize that the present invention admits of a number of modifications, within the spirit and scope of the inventive concepts. For example, the DMT transmitter and the DMT receiver may be implemented in a number of different ways. These circuits in the PHY transceivers may be implemented as specifically engineered chips having logic circuits and other components for performing the functions described above. Alternatively, one or both may be implemented using a general purpose digital signal processor and appropriate programming.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A timing method for demodulating discrete multi-tone data signals communicated over a random access link, comprising:

digitally sampling analog signals received over the link at a predetermined rate;

from the digital samples of the analog signal, detecting a predetermined number of cycles of a defined periodic signal within a specified frequency band as a timing mark at the beginning of a portion of a random access data communication;

after a predetermined number of the samples following the timing mark, capturing the samples over a time period corresponding to a discrete multi-tone symbol;

processing the predetermined number of the samples to demodulate a plurality of bits of data from each of a plurality of discrete tone channels represented within the discrete multi-tone symbol.

2. A method as in claim 1, wherein the processing step comprises discriminating a phase of a tone in each discrete tone channel as a representation of a plurality of the bits of the information.

3. A method as in claim 2, wherein the step of discriminating comprises determining a phase difference of each discrete tone of the symbol with respect to a prior signal of each respective one of the tone channels.

4. A method as in claim 1, wherein the processing step comprises:

discarding a first specified number of the samples corresponding to a portion of a cyclic prefix; and after the first specified number of samples, processing a second specified number of the samples to demodulate the bits of data from a discrete multi-tone waveform.

5. A method as in claim 4, wherein the cyclic prefix comprises a copy of predetermined number of samples of the discrete multi-tone waveform.

6. A method as in claim 1, wherein the predetermined number of samples following the timing mark includes an interval for reception of an identification signal.

7. A method as in claim 6, further comprising processing samples during the interval for reception of an identification signal to determine whether there has or has not been a valid reception of an identification signal during the interval as an indication of whether or not there has been a collision.

8. A method as in claim 1, wherein the predetermined number of samples following the timing mark includes at least one interval for reception of a preceding discrete multi-tone symbol.

9. A method as in claim 8, wherein the preceding discrete multi-tone symbol comprises a reference symbol containing reference information for use in the processing step.

10. A method as in claim 1, wherein the defined periodic signal comprises a sinusoidal waveform.

11. A method as in claim 1, wherein the analog signals are received over a line comprising in-house telephone wiring.

12. A method as in claim 1, wherein the link is a shared media for random access by a plurality of discrete multi-tone transmitters coupled to the link and at least one discrete multi-tone receiver coupled to the link for reception of symbols from the plurality of transmitters.

13. A method of communicating data over a link, comprising:

randomly accessing the link from one of a plurality of data devices coupled to the link;

transmitting over the link a predetermined number of cycles of a defined periodic signal within a specified frequency range as a timing mark representing a beginning of a packet of a random access communication;

after a predetermined interval following the cycles of the timing mark, transmitting a predetermined number of signal samples as a cyclic prefix over the link; and after the samples of the cyclic prefix, transmitting over the link a predetermined number of signal samples of a discrete multi-tone waveform representing a plurality of tones modulated with a plurality of bits of information over the link.

14. A method as in claim 13, further comprising:

receiving analog signals over the link;

digitally sampling the received analog signals at a predetermined rate;

from the digital samples of the received analog signals, detecting a predetermined number of cycles of the defined periodic signal as a timing mark at the beginning of a data communication;

after a predetermined number of the samples following the detected timing mark, capturing the digital samples of the received analog signals over a time period corresponding to one discrete multi-tone waveform; and processing the captured samples to demodulate the plurality of bits of information from discrete tone channels within the one discrete multi-tone waveform.

15. A method as in claim 14, wherein the predetermined number of the samples following the detected timing mark includes at least part of the predetermined number of signal samples of the cyclic prefix.

16. A method as in claim 13, wherein the step of transmitting a predetermined number of signal samples of a discrete multi-tone waveform comprises:

placing a specific number of bits of a serial input data stream into each of a plurality of parallel bins corresponding to discrete tone frequencies within the symbol; and mapping each of the specific number of bits into a point of a modulation constellation; and generating an analog waveform containing a plurality of discrete tone signals, each discrete tone signal being modulated in a manner corresponding to one of the points.

17. A method as in claim 16, wherein the discrete tone signals are modulated with respect to phase.

18. A method as in claim 17, wherein the discrete tone signals are differentially modulated.

19. A method as in claim 13, wherein the defined periodic signal comprises a sinusoidal waveform.

20. A discrete multi-tone receiver for use on an analog link carrying modulated digital data, comprising:

a time mark detector, coupled to the link, for detecting cycles of a defined periodic signal of a predetermined frequency from digital samples of analog signals received over the link, as a timing mark at the beginning of a random access data communication;

a control, responsive to detection of the defined periodic signal by the time mark detector, for initiating a demodulation operation a predetermined number of sampling periods after the detected cycles of the timing mark; and a discrete multi-tone demodulator, responsive to the control, for processing a predetermined number of subsequent samples of analog signals received over the line corresponding to a discrete multi-tone waveform to recover a plurality of bits of information from each of a plurality of modulated discrete frequency tones within the waveform.

21. A discrete multi-tone receiver as in claim 20, further comprising an analog front end for coupling the receiver to twisted pair telephone wiring.

22. A discrete multi-tone transmitter for use on an analog link to send modulated digital data, comprising:

means coupled to the link for generating and transmitting over the link a predetermined number of cycles of a defined periodic signal of a predetermined frequency, as a timing mark at the beginning of a random access data communication by the transmitter; and means for discrete multi-tone modulation of bits of digital information into a symbol a predetermined number of sampling intervals after transmission of the timing mark for transmission over the line.

23. A discrete multi-tone transmitter as in claim 22, further comprising means for generating and transmitting over the link a cyclic prefix of a specified number of samples after the predetermined number of sampling intervals between the timing mark and the symbol.

24. A machine readable data carrier, comprising:

a predetermined number of cycles of a defined periodic signal of a specific frequency representing a timing mark at the beginning of a random access data communication;

a predetermined number of sampling intervals of a cyclic prefix at a specified interval following the timing mark;

a discrete multi-tone waveform of a set number of sampling intervals, following the intervals of the cyclic prefix, the waveform comprising a plurality of discrete tone channels, each tone channel containing a tone signal phase modulated with a plurality of bits of data.

25. A machine readable data carrier as in claim 24, wherein each tone signal is differential phase modulated with the plurality of bits of data.

26. A machine readable data carrier as in claim 25, further comprising a reference symbol.

27. A machine readable data carrier as in claim 24, further comprising a terminal identification.

28. A machine readable data carrier as in claim 24, wherein the defined periodic signal is a sinusoidal signal.

* * * * *